(12) United States Patent
Kanugovi et al.

(10) Patent No.: US 10,142,965 B2
(45) Date of Patent: Nov. 27, 2018

(54) METHODS AND DEVICES FOR PROVIDING APPLICATION SERVICES TO USERS IN COMMUNICATIONS NETWORK

(71) Applicants: Satish Kanugovi, Bangalore (IN); Vasudevan Subramanian, Morristown, NJ (US); Alistair Urie, Issy-les-Moulineaux (FR)

(72) Inventors: Satish Kanugovi, Bangalore (IN); Vasudevan Subramanian, Morristown, NJ (US); Alistair Urie, Issy-les-Moulineaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/501,360

(22) Filed: Sep. 30, 2014

(65) Prior Publication Data

US 2016/0037428 A1  Feb. 4, 2016

Related U.S. Application Data

(60) Provisional application No. 62/032,340, filed on Aug. 1, 2014.

(51) Int. Cl.
*H04W 72/04* (2009.01)
*H04L 29/06* (2006.01)
(Continued)

(52) U.S. Cl.
CPC ............. *H04W 72/04* (2013.01); *H04L 69/14* (2013.01); *H04L 69/16* (2013.01); *H04W 76/15* (2018.02); *H04W 76/12* (2018.02); *H04W 92/045* (2013.01)

(58) Field of Classification Search
None
See application file for complete search history.

(56) References Cited

U.S. PATENT DOCUMENTS

2011/0235514 A1\* 9/2011 Huang ............... H04B 7/15528
   370/235
2012/0182929 A1\* 7/2012 Chen ................... H04L 63/1458
   370/315
(Continued)

FOREIGN PATENT DOCUMENTS

WO   WO-2012116897 A1   9/2012
WO   WO-2014021761 A2   2/2014

OTHER PUBLICATIONS

International Search Report and Written Opinion dated Nov. 24, 2015 and issued in International Application No. PCT/US2015/042801.

(Continued)

*Primary Examiner* — Ayaz R Sheikh
*Assistant Examiner* — Tarell A Hampton
(74) *Attorney, Agent, or Firm* — Harness, Dickey & Pierce, P.L.C.

(57) ABSTRACT

In a method for providing application services to a user in a communications network, a first multi-path transport control protocol (MPTCP) flow is mapped to a first evolved packet system (EPS) bearer associated with a first serving base station for the user, and a second MPTCP flow is mapped to a second EPS bearer associated with a second serving base station for the user. The first MPTCP flow is output on the first EPS bearer for delivery to the user through the first serving base station, and the second MPTCP flow is output on the second EPS bearer for delivery to the user through the second serving base station. Each of the first and second MPTCP flows correspond to a same multipath transport control protocol MPTCP connection for an application.

16 Claims, 6 Drawing Sheets

(51) Int. Cl.
*H04W 76/15* (2018.01)
*H04W 92/04* (2009.01)
*H04W 76/12* (2018.01)

(56) References Cited

U.S. PATENT DOCUMENTS

| | | | |
|---|---|---|---|
| 2012/0236801 A1* | 9/2012 | Krishnaswamy | H04W 76/026 370/329 |
| 2013/0089035 A1* | 4/2013 | Sun | H04W 76/025 370/329 |
| 2013/0155903 A1* | 6/2013 | Bi | H04B 7/024 370/255 |
| 2013/0311614 A1 | 11/2013 | Salkintzis | |
| 2014/0010192 A1* | 1/2014 | Chang | H04L 5/001 370/329 |
| 2014/0219248 A1* | 8/2014 | Reddiboyana | H04W 76/025 370/331 |
| 2014/0241317 A1* | 8/2014 | Jamadagni | H04W 76/025 370/331 |
| 2014/0269632 A1* | 9/2014 | Blankenship | H04W 76/025 370/336 |
| 2014/0341031 A1 | 11/2014 | Mutikainen | |
| 2014/0341112 A1* | 11/2014 | Agiwal | H04L 67/14 370/328 |
| 2015/0003402 A1* | 1/2015 | Chang | H04W 72/0406 370/329 |
| 2015/0009826 A1* | 1/2015 | Ma | H04W 28/0268 370/235 |
| 2015/0131535 A1 | 5/2015 | Wallentin et al. | |
| 2015/0229970 A1* | 8/2015 | Ma | H04L 47/20 370/260 |
| 2015/0245403 A1* | 8/2015 | Futaki | H04W 76/025 370/329 |
| 2015/0271087 A1* | 9/2015 | Yiu | H04L 47/35 370/230 |
| 2016/0007295 A1* | 1/2016 | Kahn | H04W 52/0251 370/311 |
| 2016/0205586 A1 | 7/2016 | Kim et al. | |
| 2017/0104717 A1 | 4/2017 | Vesterinen et al. | |

OTHER PUBLICATIONS

Bonaventure & Paasch, "Experience with Multipath TCP draft-bonaventure-mptcp-experience-00", MPTCP Working Group, Internet Engineering Task Force, pp. 1-19, retrieved on Jul. 1, 2014.
US Office Action dated Aug. 26, 2016 in U.S. Appl. No. 14/568,625.
U.S. Office Action issued in corresponding U.S. Appl. No. 14/568,625, dated Apr. 7, 2017.

\* cited by examiner

METHODS AND DEVICES FOR PROVIDING APPLICATION SERVICES TO USERS IN COMMUNICATIONS NETWORK

CROSS-REFERENCE TO RELATED APPLICATIONS

This application claims priority under 35 U.S.C. §119(e) to provisional U.S. application No. 62/032,340, filed on Aug. 1, 2014, the entire contents of which are incorporated herein by reference.

BACKGROUND

The dual connectivity (DC) feature in $3^{rd}$ Generation Partnership Project Long Term Evolution (3GPP LTE) networks provides a mechanism to aggregate radio resources across separate cell sites (or eNBs) to serve a particular user. In utilizing this mechanism, a user in a 3GPP LTE network may set-up multiple S1 bearers with different QoS characteristics for multiple classes of applications supported by the user.

Several modes of DC operation are set forth in 3GPP LTE standards. In one example mode (referred to as DC-1A) radio resources from two eNodeBs (eNBs) are allocated to the user on a per-bearer basis (i.e., a given bearer of the user is served by either of one of the eNBs). In this example, when the user is being served by a 3GPP LTE network, a Transport Control Protocol (TCP) flow corresponding to a particular application is mapped at the PDN Gateway (PGW) to a single Evolved Packet System (EPS) bearer and delivered over the single S1 bearer served by a current master eNB (MeNB) or a current secondary eNB (SeNB). Hence, in this mode, an application that runs on a particular bearer experiences throughput that is, at most, the capacity of one of the serving eNBs. This mode (i.e., mode DC-1A) does not provide a mechanism to offer an aggregate of capacities by utilizing multiple serving eNBs for a single application service.

The same issue as in mode DC-1A is manifested in schemes that allow simultaneous use of 3GPP LTE networks and wireless-local-area-networks (WLANs). The current schemes of using access network discovery and selection function (ANDSF) to implement multiple-access packet data network (PDN) connectivity (MAPCON) and Internet Protocol (IP) flow mobility and seamless offload (IFOM) techniques allow use of a single radio technology for a given application. In MAPCON, a device uses a separate IP address for each IP service, known as an active Access Point Name (APN), and the associated PDN gateway (PGW) may independently switch between 3GPP LTE and WLAN access for each APN. If different applications use different APNs, then both 3GPP LTE networks and WLANs may be used simultaneously, but any given application may only use one access at a time. In IFOM, the associated PGW may split IP flows between the two accesses (e.g., 3GPP LTE networks and WLANs) to allow a given application to utilize both accesses simultaneously. However, IFOM techniques only allow for one access per bearer type.

SUMMARY

One or more example embodiments enable delivery of multiple TCP flows over multiple EPS bearers, which are routed to the user via multiple eNBs serving a user. The multiple TCP flows may be offered to the application as an aggregate using the multipath TCP connection protocol (MPTCP).

One or more example embodiments may also be applicable to aggregate flows across multiple technologies, such as $3^{rd}$ Generation Partnership Project Long Term Evolution (3GPP LTE) and wireless local area networks (WLAN) carriers, and for devices with multiple subscriptions capability to aggregate resources across wireless service providers to provide enhanced throughput for users in networks.

At least one example embodiment provides a gateway network element including: a memory storing a program routine or module; and at least one processor configured, by executing the program routine or module, to: map a first multi-path transport control protocol (MPTCP) flow to a first evolved packet system (EPS) bearer associated with a first serving base station for the user; map a second multi-path transport control protocol (MPTCP) flow to a second EPS bearer associated with a second serving base station for the user, each of the first and second MPTCP flows corresponding to a same multipath transport control protocol (MPTCP) connection for an application; output the first MPTCP flow on the first EPS bearer for delivery to the user through the first serving base station; and output the second MPTCP flow on the second EPS bearer for delivery to the user through the second serving base station.

At least one other example embodiment provides a method for providing application services to a user in a communications network, the method including: mapping a first multi-path transport control protocol (MPTCP) flow to a first evolved packet system (EPS) bearer associated with a first serving base station for the user; mapping a second multi-path transport control protocol (MPTCP) flow to a second EPS bearer associated with a second serving base station for the user, each of the first and second MPTCP flows corresponding to a same multipath transport control protocol (MPTCP) connection for an application; outputting the first MPTCP flow on the first EPS bearer for delivery to the user through the first serving base station; and outputting the second MPTCP flow on the second EPS bearer for delivery to the user through the second serving base station.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
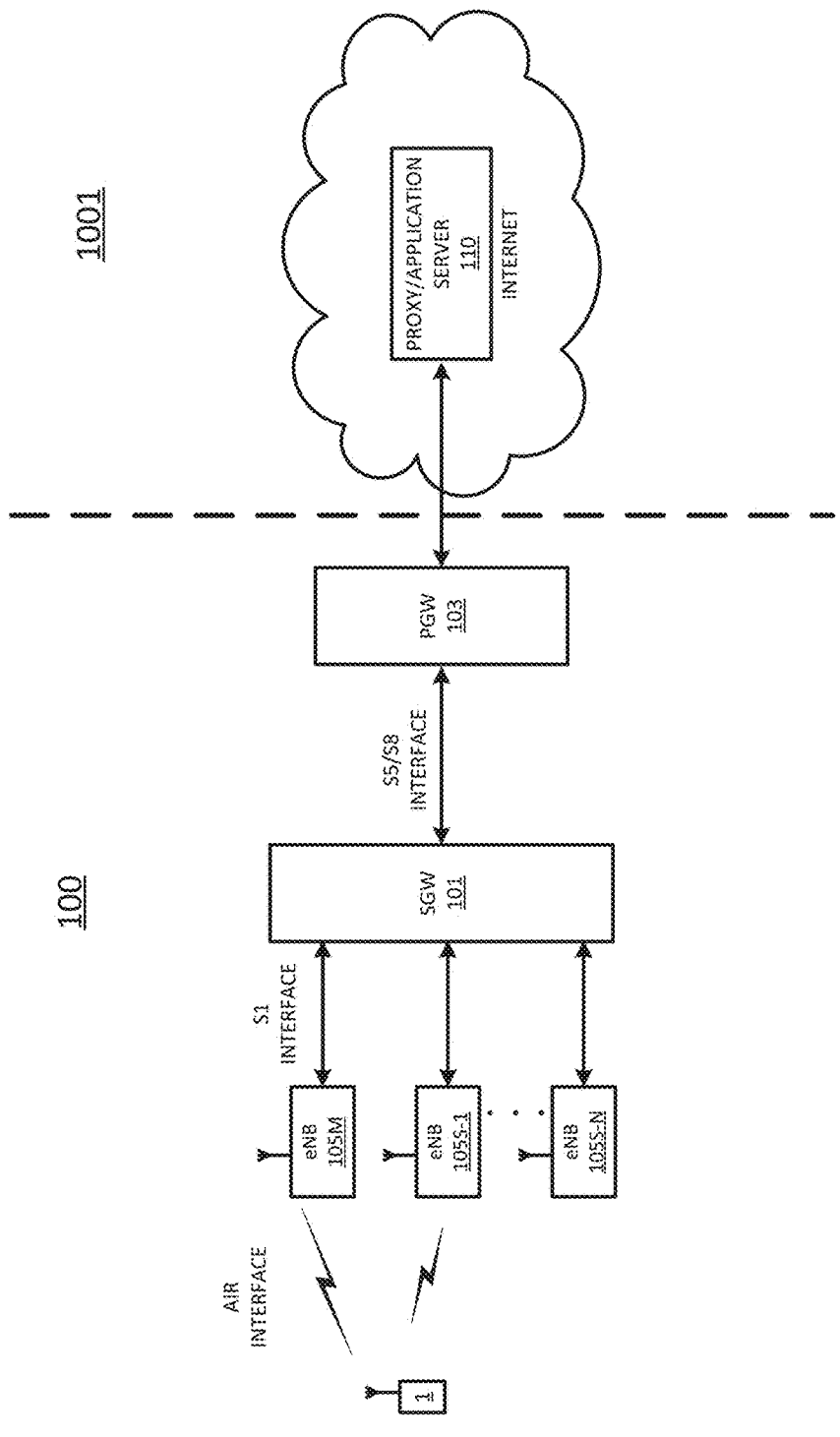
FIG. 1 illustrates a portion of an Evolved Packet System (EPS).

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing base stations, NodeBs, eNodeBs, gateways, servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all functionally associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communication network.

As discussed herein, uplink (or reverse link) transmissions refer to transmissions from user to eNB (or network), whereas downlink (or forward link) transmissions refer to transmissions from eNB (or network) to user. Example embodiments are primarily discussed herein within regard to downlink communications. However, it should be understood that example embodiments may also be applicable to uplink communications.

As discussed herein, application services refer to services provided in a 3GPP network, such as a 3GPP LTE network. In one example, application services may include voice over Internet Protocol (VoIP), multimedia applications, including audio and/or video content, web browsing, instant messaging, email download, software download or any other IP based service delivered to a mobile or other device using 3GPP access.

According to example embodiments, the packet data network (PDN) gateways (PGW), serving gateways (SGW), UEs, application/proxy servers, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a PGW and/or SGW may be any well-known gateway or other physical computer hardware system. The PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., PGW, SGW, application/proxy server, eNBs, etc.); and to transmit/receive (wireline or wirelessly) controls signals via a control plane or interface to/from other network elements.

The PGW and/or the SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs may include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes or interfaces to/from one or more switches, gateways, MMEs, controllers, other eNBs, UEs, etc.

As discussed herein, the eNBs, PGW, SGW, and application/proxy server may be collectively referred to as network elements.

FIG. 1 illustrates a portion of an Evolved Packet System (EPS). The EPS includes an Internet Protocol (IP) Connectivity Access Network (IP-CAN) 100 and an IP Packet Data Network (IP-PDN) 1001.

Referring to FIG. 1, the IP-CAN 100 includes: a serving gateway (SGW) 101; a packet data network (PDN) gateway (PGW) 103; and a plurality of eNBs 105M, 105S-1, . . . , 105S-N. Although not shown, the IP-CAN 100 may further include a mobile management entity (MME) as well as other network elements, which are well-known in the art.

The IP-PDN 1001 portion of the EPS includes an application or proxy server (referred to as application/proxy server) 110.

Within the IP-CAN 100, the eNBs 105M through 105S-N are part of what is referred to as an Evolved Universal Mobile Telecommunications System (UMTS) Terrestrial Radio Access Network (EUTRAN), and the portion of the IP-CAN 100 including the SGW 101, the PGW 103, and the MME (not shown) is referred to as an Evolved Packet Core (EPC).

The plurality of eNBs 105M through 105S-N provide wireless resources and radio coverage for UEs including UE 1. For the purpose of clarity, only one UE is illustrated in FIG. 1. However, any number of UEs may be connected to one or more of the eNBs 105M through 105S-N. In the example shown in FIG. 1, the UE 1 is attached to both eNB 105M and eNB 105S-1, and thus, the eNBs 105M and 105S-1 may be referred to as serving eNBs (or serving cells) 105M and 105S-1.

According to at least some example embodiments, at least the eNBs 105M and 105S-1 may have a master-slave relationship using principles defined for the 3GPP feature known as "Dual-Connectivity" (DC) in which eNB 105M is a current master eNB (MeNB) and eNB 105S-1 is a current slave or secondary eNB (SeNB). Because master-slave relationships between eNBs such as this are generally well-known, a more detailed discussion is omitted.

Example functionality of the UE 1 and eNBs 105M through 105S-N will be described in more detail later with regard to FIGS. 2-5.

Still referring to FIG. 1, the eNBs 105M through 105S-N are operatively connected to the SGW 101 over multiplicity of the S1-U interfaces, one per eNB. The eNBs 105M through 105S-N and the SGW 101 communicate over the S1-U interface using EPS bearers (sometimes referred to as S1 bearers) to carry user plane traffic to UE 1. The SGW 101 serves as the gateway between the EUTRAN and the EPC. As discussed in more detail later, the SGW 101 routes and forwards EPS bearers carrying Internet Protocol (IP) data packets to eNBs over the S1-U interface for further transmission to UEs attached to the eNBs. The SGW 101 is also operatively connected to the PGW 103 over the S5/S8 interface. The SGW 101 and the PGW 103 communicate using EPS bearers carried over the S5/S8 interface.

To provide a connection between the eNBs 105M through 105S-N and the PGW 103, the SGW 101 stores a current one-to-one mapping between EPS bearers carried over the S1 interface and S5/S8 interface.

A "virtual" connection between two endpoints (e.g., UE and PGW) in an EPS is referred to as an EPS bearer. A given EPS bearer is characterized by at least: the two endpoints; a QoS Class Index (QCI) that describes the type of service that makes use of the virtual connection (e.g., conversational voice, streaming video, signaling, best effort, etc.); and a Traffic Flow Template (TFT) that describes one or more packet filter specifications. Each packet filter specification describes a particular traffic flow and is expressed in terms of pattern matches for IP protocol identifier and source/destination IP addresses and port numbers (collectively known as a 5-tuple), for which the transport service is provided between the two endpoints.

In the example shown in FIG. 1, a given EPS bearer is carried over a S5/S8 interface between the PGW 103 and the SGW 101, the S1 interface between the SGW 103 and an eNB, and a radio interface between the eNB and the UE 1.

Still referring to FIG. 1, the PGW 103 serves as an interface between the IP-PDN 1001 and the EPC portion of the IP-CAN 100. The PGW 103 is responsible for IP address allocation for UEs, as well as Quality of Service (QoS) enforcement and flow-based charging according to rules from a Policy Control and Charging Rules Function (PCRF). The PGW 103 is also responsible for filtering of downlink IP packets onto the different QoS-based bearers (e.g., EPS bearers) based on Traffic Flow Templates (TFTs) using TFT filters. The TFT filters use IP packet header information such as source and/or destination IP addresses and/or port numbers along with the IP protocol identifier (e.g., to indicate usage of Transmission Control Protocol (TCP)) to filter and distinguish packets for different applications (e.g., VoIP versus web-browsing traffic, etc.), so that each packet is sent on a respective EPS bearer with the appropriate QoS. Further discussion regarding the functionality of the SGW 101 and the PGW 103 will be provided later with regard to FIGS. 2-5.

Although not shown in FIG. 1, the SGW 101 and the eNBs 105M through 105S-N may also be operatively connected to a MME (not shown). The MME is the control-node that processes signaling between UEs and the core network (CN) using Non Access Stratum (NAS) protocols. The MME is responsible for all control plane functions related to subscriber and session management. From that perspective, the MME supports security procedures, terminal-to-network session handling, and idle terminal location management. Because general functionality of MMEs is well-known, a more detailed discussion is omitted.

Still referring to FIG. 1, the application/proxy server 110 may be a web server that hosts multimedia content (e.g., voice, video, etc.). In another example, the application/proxy server 110 may be a VoIP server providing VoIP services to users in the network, a web server, instant messaging server, email server, software and/or cloud server, or any other IP based service delivered to a mobile or other device using 3GPP access.

Example embodiments will be described with regard to the example EPS shown in FIG. 1, and with regard to a 3GPP LTE network. However, it should be understood that example embodiments may be applicable to other types of radio access technologies, such as enhanced voice-data only (EVDO) radio access technology, high-speed downlink packet access (HSPDA), HSPDA+, wideband code division multiple access (WCDMA), worldwide interoperability for microwave access (WiMAX), etc.

As is known, multipath TCP (MPTCP) allows a Transport Control Protocol (TCP) connection to operate across multiple paths simultaneously. In more detail, MPTCP is a modified version of TCP that supports the simultaneous use of multiple paths between hosts. A MPTCP connection refers to a set of one or more sub-flows, over which an application is able to communicate between hosts. There is a one-to-one mapping between a MPTCP connection and a TCP application socket. In the context of MPTCP, a path refers to a sequence of links between hosts (e.g., sender and receiver), and is defined by a 4-tuple of source and destination address/port pairs (e.g., a source and destination IP address pair and a source and destination TCP port pair). A sub-flow refers to a flow of TCP segments over an individual path, which forms part of the larger MPTCP connection. A sub-flow is initiated and terminated in the same or substantially the same manner as a regular TCP connection.

In an EPS, a MPTCP connection may be transported over a 3GPP LTE network using a defined set of EPS bearers. The PGW uses the EPS bearer traffic flow templates (TFTs) to assign each sub-flow to a different EPS bearer.

As mentioned above, an EPS bearer is a "virtual" connection between two endpoints (e.g., UE and PGW) in an EPS. A given EPS bearer is characterized by at least: the two endpoints; a QoS Class Index (QCI) that describes the type of service that makes use of the virtual connection (e.g., conversational voice, streaming video, signaling, best effort, etc.); and a Traffic Flow Template (TFT) that describes one or more packet filter specifications. Each packet filter specification describes a particular traffic flow and is expressed in terms of pattern matches for IP protocol identifier and source/destination IP addresses and port numbers (collectively known as a 5-tuple), for which the transport service is provided between the two endpoints. As also mentioned above, an EPS bearer is sometimes used to refer to a set of traffic flows (or sub-flows) that receive a common QoS treatment between a PGW and a UE. An EPS bearer TFT is a set of all packet filters associated with a given EPS bearer.

One or more example embodiments enable delivery of multiple TCP sub-flows (also sometimes referred to as flows) for a MPTCP connection to a UE over multiple EPS bearers routed to the UE via multiple different eNBs serving the UE. The multiple TCP sub-flows may be offered to the application at the UE as an aggregate using the MPTCP connection.

The multiple TCP sub-flows may be created over the same destination IP address using a different source and/or destination TCP ports to differentiate between sub-flows, with the PGW being configured to deliver the TCP sub-flows over additional bearers within the same Access Point Name (APN).

In another example, the additional TCP sub-flows may be created over different destination IP addresses with the PGW configured to deliver the TCP sub-flows over additional EPS bearers associated with additional APNs.

According to current 3GPP standards, a PDN connection refers to an association between a UE and a PDN. The UE is represented by one IPv4 address and/or one IPv6 prefix, and the PDN is represented by an Access Point Name (APN). MPTCP paths may be assigned to EPS bearers using either (i) one MPTCP path per 3GPP PDN connection, and hence, each MPTCP path is identified by a unique IPv4 address and/or IPv6 Prefix; or (ii) using specific source and/or destination port numbers and common IP addresses to carry the multiple MPTCP paths over a common 3GPP PDN connection, which is then mapped to multiple EPS bearers according to unique port numbers reflected in the EPS bearer TFT packet filter descriptions. In either case, when 3GPP LTE dual-connectivity (DC) access is used, the SGW may switch and/or map the multiple EPS bearers (e.g., when transitioning from the S5/S8 interface to the S1 interface) such that MPTCP paths traverse different eNBs, thereby delivering individual TCP sub-flows to the UE via different eNBs, for example, via the current Master eNB (MeNB) and the current Slave or Secondary eNB (SeNB).

Figure 4:
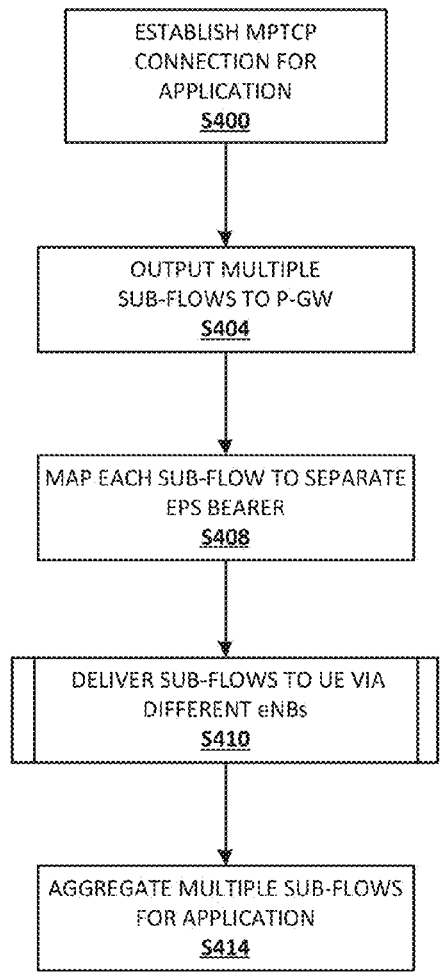
FIG. 4 is a flow chart illustrating an example embodiment of a method for providing application services to users.

FIG. 4 is a flow chart illustrating an example embodiment of a method for providing application services to users. The method shown in FIG. 4 will be described with regard to the EPS shown in FIG. 1. However, it should be understood that the method shown in FIG. 4 may be applicable to (or implemented in conjunction with) other networks. Moreover, example embodiments may be described in some instances with regard to only two independent TCP sub-flows and two serving eNBs. However, example embodiments should not be limited to only two TCP sub-flows and two serving eNBs. Rather, any number of TCP sub-flows may be used for a given application.

Referring to FIG. 4, at step S400 the UE 1 establishes a multipath TCP (MPTCP) connection with the application/proxy server 110 for a requested application (e.g., audio, video, multimedia call, VoIP, etc.).

In one example, for "pull services", the UE 1 establishes the MPTCP connection by opening a TCP application socket for the application using well-known MPTCP procedures. In another example, for "push services", the application/proxy server 110 opens the TCP application socket for the application using well-known MPTCP procedures. After opening an initial MPTCP connection and generating an initial TCP sub-flow, one or more additional sub-flows may be added to the MPTCP connection using well-known MPTCP procedures. For example, setup or adding of additional sub-flows for a MPTCP connection may be achieved using well-known path management methods. Since procedures for establishing MPTCP connections and adding further sub-flows are well-known, a more detailed discussion is omitted for the sake of brevity.

In the context of MPTCP, multiple paths and/or sub-flows are identified by the presence of multiple addresses at one or more endpoints (e.g., source and/or destination) of the MPTCP connection. Combinations of the multiple source and destination address pairs equate to additional paths and sub-flows for the MPTCP connection. In one example, the multiple paths for a MPTCP connection may be created using multiple different TCP ports, but the same destination IP address, at one or more endpoints of the MPTCP connection. In this case, the multiple TCP sub-flows are created using multiple different TCP ports at one or more endpoints of the MPTCP connection, and the TCP sub-flows are delivered over additional bearers within the same APN.

In another example, multiple paths are created using multiple different IP addresses at the destination of the MPTCP connection. In this example, each of the paths and sub-flows is associated with a different destination IP address for the UE 1.

Returning to FIG. 4, at step S404 the application/proxy server 110 outputs the multiple TCP sub-flows to the PGW 103, for example, over the SGi interface between the IP-PDN 1001 and the PGW 103.

At step S408, the PGW 103 maps each of the TCP sub-flows to a separate EPS bearer between the PGW 103 and the UE 1. The PGW 103 maps the TCP sub-flows to the EPS bearers based on quality of service information and at least one of source and destination address information for each of the sub-flows. In one example, the PGW 103 maps the TCP sub-flows to EPS bearers using a 5-tuple TFT packet filter.

In more detail, the PGW 103 applies a 5-tuple TFT packet filter loaded by a Policy Control and Charging Rules Function (PCRF) over the Gx interface to map the sub-flows onto respective EPS bearers, each with a pre-defined Quality Class Index (QCI). The 5-tuple TFT packet filter includes pattern matching information describing a range of source IP address, source TCP port number, destination IP address, destination port number, and a protocol identifier. The filter description may include "wildcard" entries which are to be considered to mean "any possible value", for example, so that a given filter may be applied to "any possible source IP address".

As is known, the PCRF is responsible for policy control decision-making, as well as for controlling the flow-based charging functionalities in the policy control enforcement function (PCEF) at the PGW 103. The PCRF provides QCIs and bit rates for the TCP sub-flows for an application in accordance with parameters such as the UE's subscription profile.

In one example, if the UE 1 offers two IP addresses (and hence two different APNs), then the PGW 103 maps the TCP sub-flows to separate EPS bearers according to source and destination address information (e.g., source and destination IP address) for the sub-flows. In this example, the parameters of the 5-tuple TFT filter may be defined as:

Source IP Address: SrcIP=XX;
Source Port Number: SrcPort=YY;
Destination IP Address: DestIP=ZZ1;
Destination Port Number: DestPort=*; and
Protocol Identifier: Protocol=*
for a first APN, and
Source IP Address: SrcIP=XX;
Source Port Number: SrcPort=YY;
Destination IP Address: DestIP=ZZ2;
Destination Port Number: DestPort=*; and
Protocol Identifier: Protocol=*
for a second APN. In this example, "*" means "any value", whereas "XX", "YY", "ZZ1", "ZZ2", "A" and "B" (discussed below) represent particular values (e.g., addresses, port numbers, etc.) or ranges of values. Using these filters, the PGW 103 maps sub-flows having source IP address XX, source TCP port YY, and destination IP address ZZ1 to a first EPS bearer A, and maps sub-flows having source IP address XX, source TCP port YY and destination IP address ZZ2 to a second EPS bearer B.

If the UE 1 has only a single assigned IP address (and hence one APN), then the 5-tuple filter may be defined as:
Source IP Address: SrcIP=XX;
Source Port Number: SrcPort=YY;
Destination IP Address: DestIP=*;
Destination Port Number: DestPort=VV1; and
Protocol Identifier: Protocol=*
for a first QCI, and as
Source IP Address: SrcIP=XX;
Source Port Number: SrcPort=YY;
Destination IP Address: DestIP=*;
Destination Port Number: DestPort=VV2; and
Protocol Identifier: Protocol=*
for a second QCI. In this example, "*" means "any value", whereas "XX", "YY", "VV1", "VV2", "A" and "B" (discussed below) represent particular values (e.g., addresses, port numbers, etc.) or ranges of values. Using this filter, the PGW 103 maps sub-flows having source IP address XX, source TCP port number YY and destination port number VV1 to a first EPS bearer A, and maps sub-flows having source IP address XX, source TCP port number YY and destination port number VV2 to EPS bearer B. In this example, the sub-flows have the same source IP address and source port numbers, but different destination port numbers. Example embodiments are not limited to this example. Rather, the sub-flows may have different source IP addresses, source port numbers, and/or different destination port numbers, and may be mapped to respective bearers based on one or more of these parameters.

The first and second QCI may have the same or similar QoS characteristics (e.g., QCI 8 and QCI 9 as defined by 3GPP standards) for serving the same application. The bearers mapped to first and second QCI may be aggregated for the same application (e.g., video streaming over TCP, VoIP, etc.).

Returning to FIG. 4, at step S410 the sub-flows are delivered to the UE 1 on EPS bearers via different ones of the eNBs 105M through 105S-N. The delivery of the sub-flows from the SGW 101 to the UE 1 will be discussed in more detail below with regard to FIG. 5.

Still referring to FIG. 4, at step S414 the UE 1 aggregates the multiple sub-flows for the MPTCP connection to receive the application service from the application/proxy server 110. For example, the UE 1 uses the connection-level sequence numbers provided by the MPTCP to re-assemble packets received in each sub-flow, thereby receiving the application service.

Figure 5:
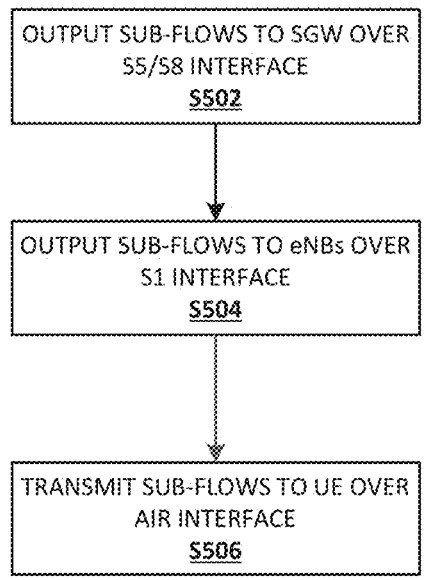
FIG. 5 is a flow chart illustrating an example embodiment of a method for delivering multiple sub-flows to a user.

FIG. 5 is a flow chart illustrating an example embodiment of step S412 in FIG. 4. More specifically, the flow chart in FIG. 5 illustrates an example embodiment of a method for delivering the sub-flows to the UE 1.

Referring to FIG. 5, at step S502 the PGW 103 outputs the TCP sub-flows to the SGW 101 on corresponding EPS bearers over the S5/S8 interface between the PGW 103 and the SGW 101.

At step S504, the SGW 101 outputs each TCP sub-flow to an eNB corresponding to the EPS bearer mapped to the TCP sub-flow on a corresponding EPS bearer over a S1 interface between the SGW 101 and the eNB.

As is generally well-known and mentioned above, the SGW 101 stores a current one-to-one mapping between EPS bearers carried over the S5/S8 interface and S1 interface. According to at least some example embodiments, using this one-to-one mapping between the EPS bearers carried over the S5/S8 interface and S1 interface, the SGW 101 switches bearers between GTP-u tunnels over the S5 interface (interface between the PGW 103 and the SGW 101) to bearers over the S1 interface (interface between the SGW 101 and the eNBs 105M through 105S-N). As a result, the MPTCP is usable within a dual-connectivity radio interface to provide aggregated radio capacity to the application since the application data and/or IP connection is split in the MPTCP layer into two parallel IP flows each with a corresponding EPS bearer.

Still referring to step S504, in one example the SGW 101 outputs a first TCP sub-flow to the eNB 105M on a first EPS bearer over a first S1 interface, outputs a second TCP sub-flow to the eNB 105S-1 on a second EPS bearer over a second S1 interface, . . . , and outputs an N-th TCP sub-flow to the eNB 105S-N on an N-th EPS bearer over an N-th S1 interface. Since the manner in which sub-flows are communicated between SGWs and eNBs over the S1 interface is generally well-known, a more detailed discussion is omitted.

At step S506, the eNBs 105M through 105S-N transmit the sub-flows to the UE 1 on radio bearers over the air interface. In one example, each eNB processes (or encodes) received packets, and then modulates the encoded packets in the TCP sub-flow into a radio-frequency (RF) stream for transmission to the UE 1 over the air interface. As is known, each of the eNBs stores a one-to-one mapping between radio bearer IDs and S1 bearers such that the eNBs are able to transmit IP packets received from the SGW 101 on a given S1 bearer to UEs using a corresponding radio bearer. Since the manner in which sub-flows are transmitted to users over the air interface (e.g., over the radio access network (RAN)) is generally well-known, further discussion is omitted.

More detailed examples of methods for providing application services to UEs will now be described with regard to the hybrid block/flow diagrams shown in FIGS. 2 and 3.

Figure 2:
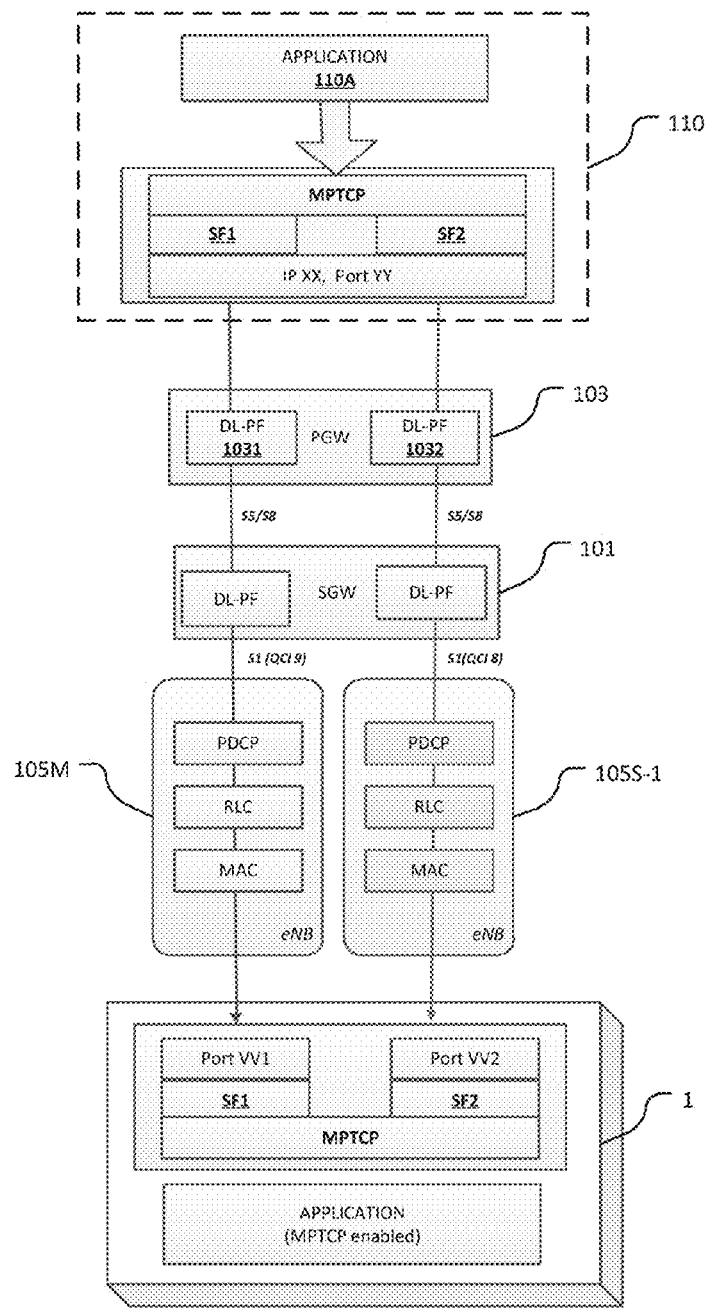
FIG. 2 is a hybrid block/flow diagram illustrating an example in which two sub-flows are established by the MPTCP layer using different destination ports associated with a single Access Point Name (APN).

FIG. 2 is a hybrid block/flow diagram illustrating an example in which two sub-flows are established using different destination ports associated with a single APN. Thus, in this example, each of the sub-flows for the MPTCP connection has a different destination port number, but the same source IP address (XX) and source port number (YY).

Figure 3:
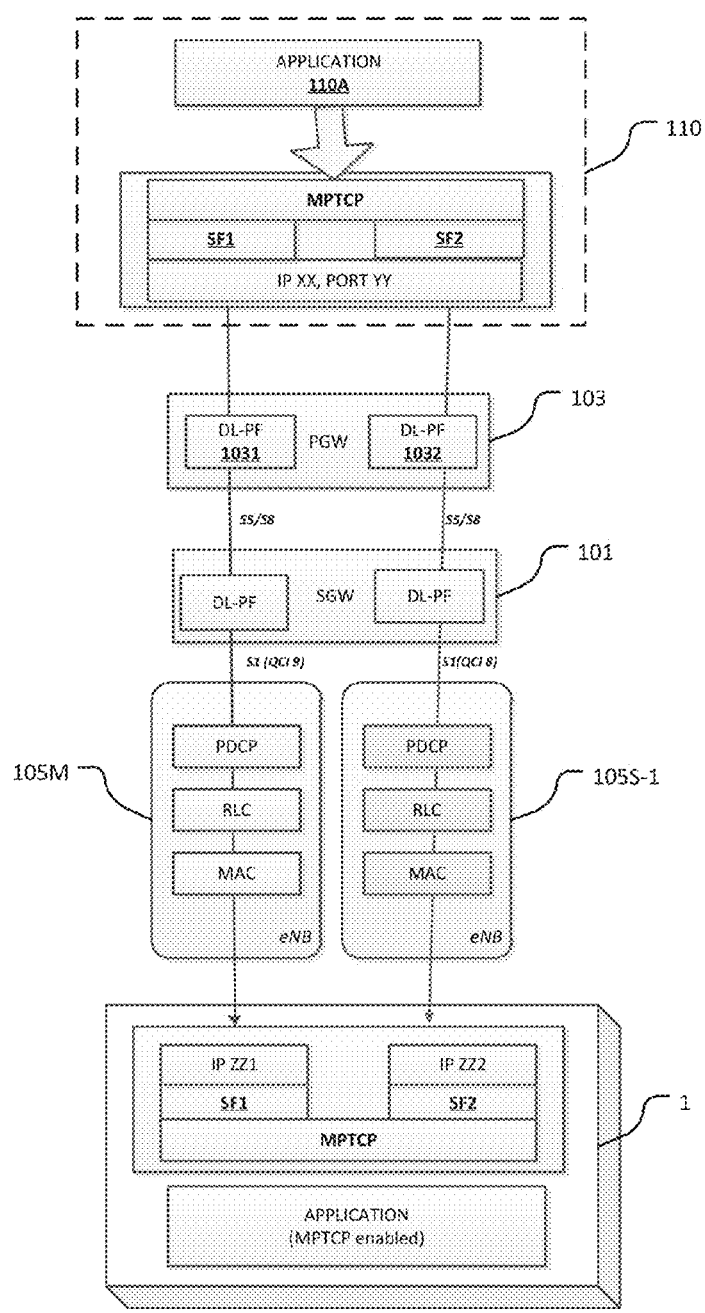
FIG. 3 is a hybrid block/flow diagram illustrating an example in which two sub-flows are established by the MPTCP layer using two different APNs.

FIG. 3 is a hybrid block/flow diagram illustrating an example in which two sub-flows are established using two different APNs. In this example, the UE 1 is associated with two different IP addresses (ZZ1 and ZZ2), and thus, each of the sub-flows for the MPTCP connection has a different destination IP address.

In each of the example embodiments shown in FIGS. 2 and 3, the sub-flows are delivered to the UE 1 via eNBs 105M and 105S-1, where eNB 105M may be considered a current master or primary eNB, and 105S-1 may be considered a current slave or secondary eNB.

Referring to FIG. 2, the UE 1 establishes a MPTCP connection with the application/proxy server 110 for the application 110A. In the example shown in FIG. 2, the MPTCP connection includes two sub-flows SF1 and SF2.

In this example, the sub-flows for the MPTCP connection are created using source port number YY corresponding to source IP address XX, and different destination port numbers VV1 and VV2 corresponding to the same destination IP address. Although the sub-flows in this example are created using different destination port numbers, example embodiments are not limited to this example. Rather, the sub-flows may be created and delivered using different source and/or destination port numbers.

The application/proxy server 110 outputs the first and second sub-flows SF1 and SF2 to the PGW 103.

The PGW 103 is configured to deliver the multiple TCP sub-flows over multiple EPS bearers within the same APN. In more detail, the PGW 103 includes downlink packet filters (DL-PF) 1031 and 1032 to map each of the first and second sub-flows SF1 and SF2 to a separate EPS bearer. Each of the downlink packet filters 1031 and 1032 may be a 5-tuple TFT packet filter (e.g., IP address and port for source and destination plus protocol identifier) loaded by a policy control and charging rules function (PCRF) over the Gx interface to map the sub-flows onto EPS bearers, each with a given (or alternatively, desired, predetermined or pre-defined) QCI. TFT packet filters such as the 5-tuple TFT packet filter mentioned here are discussed above, and thus, a detailed discussion will not be repeated here.

In this example, since the UE 1 has only a single IP address (and hence one APN), the 5-tuple filter pair is (SrcIP=XX, SrcPort=YY, DestIP=*, DestPort=VV1, Protocol=*) for a first EPS bearer (e.g., QCI=A), and (SrcIP=XX, SrcPort=YY, DestIP=*, DestPort=VV2, Protocol=*) for a second EPS bearer (e.g., QCI=B). Using this filter pair, the PGW 103 maps the first sub-flow SF1 (having SrcIP=XX, SrcPort=YY, and DestPort=VV1) to first EPS bearer A, and maps the second sub-flow SF2 (having SrcIP=XX, SrcPort=YY, and DestPort=VV2) to second EPS bearer B.

The PGW 103 delivers the first sub-flow SF1 to the UE 1 on the first EPS bearer A, and delivers the second sub-flow SF2 to the UE 1 on the second EPS bearer B.

In more detail, the PGW 103 outputs the first sub-flow SF1 to the SGW 101 on a first EPS bearer, and outputs the second sub-flow SF2 to the SGW 101 on a second EPS bearer. Both bearers are carried over the same S5/S8 interface.

Using the current one-to-one mapping between EPS bearers carried over S5/S8 interface and the S1 interface(s), the SGW 101 outputs the first sub-flow SF1 to the eNB 105M via a first of the S1 bearers (e.g., QCI A, where A=9). The SGW 101 also outputs the second sub-flow SF2 to the eNB 105S-1 via a second of the S1 bearers (e.g., QCI B, where B=8).

The eNBs 105M and 105S-1 then process and transmit the sub-flows to the UE 1 over the air interface concurrently and/or simultaneously. In more detail, each of the eNBs 105M and 105S-1 processes (or encodes) received packets at each of the Packet Data Convergence Protocol (PDCP), Radio Link Control (RLC) and Medium Access Control (MAC) layers, and then modulates the encoded data packets into a radio-frequency (RF) stream for transmission to the UE 1 on radio bearers over the air interface between the eNBs and the UE 1.

After demodulating and decoding the transmitted signals from the eNBs 105M and 105S-1, the UE 1 receives the first sub-flow SF1 from the eNB 105M through destination port number VV1, and receives the second sub-flow SF2 from the eNB 105S-1 through destination port number VV2. At the MPTCP layer, the UE 1 aggregates the first and second sub-flows SF1 and SF2 using the connection-level sequence numbers provided by the MPTCP to re-assemble packets received in each sub-flow, thereby receiving the application service data.

Referring now to the example in FIG. 3, the UE 1 establishes a MPTCP connection with the application/proxy server 110 for the application 110A. As with FIG. 2, in the example shown in FIG. 3, the MPTCP connection includes two sub-flows SF1 and SF2.

In this example, the sub-flows for the MPTCP connection are separated according to destination IP address and the EPS bearers are isolated according to destination IP address. Although this example is discussed with regard to distinguishing between sub-flows using only destination IP addresses, example embodiments should not be limited to this example. Rather, the sub-flows may be distinguished from one another using destination address information as well as source address information (e.g., IP address, port number, etc.).

As with the example shown in FIG. 2, using the downlink packet filters (DL-PF) 1031 and 1032 the PGW 103 maps the first and second sub-flows SF1 and SF2 to respective EPS bearers using 5-tuple TFT packet filters.

In this example, since the UE 1 offers (or is associated with) two IP addresses (and hence two different APNs) the 5-tuple filter pair is (SrcIP=XX, SrcPort=YY, DestIP=ZZ1, DestPort=*, Protocol=*) for the first EPS bearer (e.g., QCI=A), and (SrcIP=XX, SrcPort=YY, DestIP=ZZ2, DestPort=*, Protocol=*) for the second EPS bearer (e.g., QCI=B). Using this filter pair, the PGW 103 maps the first sub-flow SF1 (having the parameters SrcIP=XX, SrcPort=YY, and DestIP=ZZ1) to the first EPS bearer A, and maps the second sub-flow SF2 (having the parameters SrcIP=XX, SrcPort=YY, and DestIP=ZZ2) to the second EPS bearer B.

The PGW 103 delivers the first sub-flow SF1 to the UE 1 on the first EPS bearer A, and delivers the second sub-flow SF2 to the UE 1 on the second EPS bearer B.

In more detail, the PGW 103 outputs the first sub-flow SF1 to the SGW 101 on a first EPS bearer, and outputs the second sub-flow SF2 to the SGW 101 on a second EPS bearer.

As mentioned above, the SGW 101 stores a current one-to-one mapping between EPS bearers carried over the S5/S8 interface and EPS bearers carried over the S1 interface(s). Using this one-to-one mapping between the EPS bearers carried over the S5/S8 interface and S1 interface(s), the SGW 101 switches bearers between GTP-u tunnels over the S5 interface (interface between the PGW 103 and the SGW 101) to bearers over the S1 interface(s) (interface(s) between the SGW 101 and the eNBs 105M through 105S-N). The SGW 101 then outputs the first sub-flow SF1 to the eNB 105M on a first EPS bearer over the S1 interface, and outputs the second sub-flow SF2 to the eNB 105S-1 on a second EPS bearer over the S1 interface.

The eNBs 105M and 105S-1 then process and transmit the sub-flows to the UE 1 on radio bearers over the air interface concurrently and/or simultaneously in the same or substantially the same manner as discussed above with regard to FIG. 2.

After demodulating and decoding the transmitted signals from the eNBs 105M and 105S-1, the UE 1 receives the first sub-flow SF1 from the eNB 105M through a port associated with destination IP address DestIP=ZZ1, and receives the second sub-flow SF2 from the eNB 105S-1 through a port associated with destination IP address DestIP=ZZ2. As discussed above with regard to FIG. 2, at the MPTCP layer the UE 1 aggregates the first and second sub-flows SF1 and SF2 using the connection-level sequence numbers provided by the MPTCP to re-assemble packets received in each sub-flow, thereby receiving the application service.

As mentioned above, the eNBs, PGW, SGW, and application/proxy server may be collectively referred to as network elements.

Figure 6:
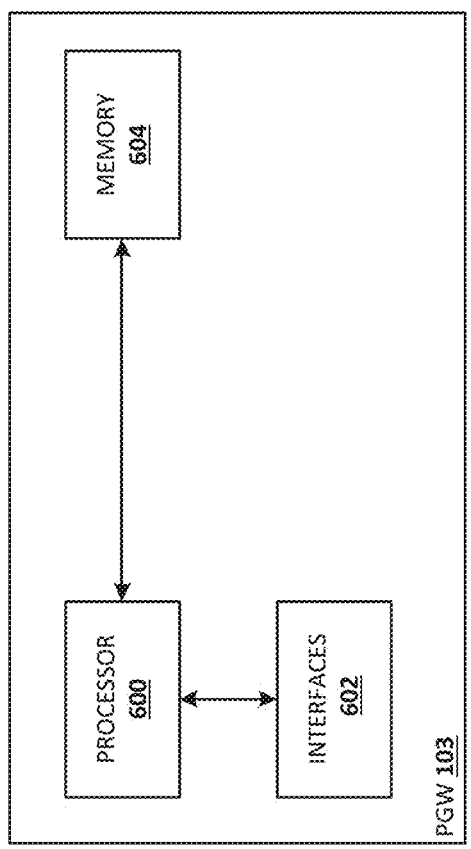
FIG. 6 is a block diagram illustrating example components of a network element according to an example embodiment.

FIG. 6 illustrates example components of a network element according to an example embodiment. For the purposes of description, the network element in FIG. 6 will be assumed to be PGW 103.

As shown, the PGW 103 includes a processor 600, connected to a memory 604 and various interfaces 602. In some embodiments, the PGW 103 may include many more components than those shown in FIG. 6. However, it is not necessary that all of these generally conventional components be shown in order to disclose the illustrative embodiment.

Memory 604 may be a computer readable storage medium that generally includes a random access memory (RAM), read only memory (ROM), and/or a permanent mass storage device, such as a disk drive. Memory 604 also stores an operating system and any other routines/modules/applications for providing the functionalities of the PGW 103, including those discussed herein. These software components may also be loaded from a separate computer readable storage medium into memory 604 using a drive mechanism (not shown). Such separate computer readable storage medium may include a disc, tape, DVD/CD-ROM drive, memory card, or other like computer readable storage medium (not shown). In some embodiments, software components may be loaded into memory 604 via one of the various interfaces 602, rather than via a computer readable storage medium. The memory 604 may also store the mappings between interfaces (e.g., between the S5/S8 interface and the S1 interface) discussed herein in accordance with example embodiments.

Processor 600 may be configured to carry out instructions of a computer program by performing the basic arithmetical, logical, and input/output operations of the system. Instructions may be provided to processor 600 by memory 604.

The various interfaces 602 may include computer hardware components that connect the PGW 103 via a wired or wireless connection to the SGW 101, application/proxy server 110, etc.

As will be understood, the interfaces 602 and programs stored in the memory 604 to set forth the special purpose functionalities of the network element will vary depending on the network element.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for providing application services to a user in a communications network, the method comprising:
   mapping, by a gateway network element including at least one processor, a first multi-path transport control protocol (MPTCP) flow to a first evolved packet system (EPS) bearer associated with a first serving base station for the user, using a first n-tuple traffic flow template (TFT) packet filter for the user, n being greater than or equal to 1;
   mapping, by the gateway network element, a second MPTCP flow to a second EPS bearer associated with a second serving base station for the user, each of the first and second MPTCP flows corresponding to a same MPTCP connection for an application, using a second n-tuple TFT packet filter for the user;
   outputting, by the gateway network element, the first MPTCP flow on the first EPS bearer for delivery to the user through the first serving base station; and
   outputting, by the gateway network element, the second MPTCP flow on the second EPS bearer for delivery to the user through the second serving base station,
   wherein each of the first and second MPTCP flows is associated with a single IP address assigned to the user.

2. The method of claim 1, wherein each of the first and second MPTCP flows are associated with at least one of (i) different source port numbers for an application server providing the application services, and (ii) different destination port numbers.

3. The method of claim 1, further comprising:
   delivering the first MPTCP flow to the first serving base station on the first EPS bearer over an S5/S8 interface between a packet data network (PDN) gateway and a serving gateway, and over a first S1 interface between the serving gateway and the first serving base station.

4. The method of claim 3, further comprising:
   delivering the second MPTCP flow to the second serving base station on the second EPS bearer over the S5/S8 interface between the packet data network (PDN) gateway and the serving gateway and over a second S1 interface between the serving gateway and the second serving base station.

5. The method of claim 1, further comprising:
   delivering the first MPTCP flow to the user through the first serving base station.

6. The method of claim 5, further comprising:
   delivering the second MPTCP flow to the user through the second serving base station.

7. The method of claim 1, wherein each of the first and second EPS bearers have the same quality of service characteristics.

8. A gateway network element comprising:
   a memory storing a program routine or module; and
   at least one processor configured, by executing the program routine or module, to,
      map a first multi-path transport control protocol (MPTCP) flow to a first evolved packet system (EPS) bearer associated with a first serving base station for a user, using a first n-tuple traffic flow template (TFT) packet filter for the user, n is greater than or equal to 1,
      map a second MPTCP flow to a second EPS bearer associated with a second serving base station for the user, each of the first and second MPTCP flows corresponding to a same MPTCP connection for an application, using a second n-tuple TFT packet filter for the user,
      output the first MPTCP flow on the first EPS bearer for delivery to the user through the first serving base station, and
      output the second MPTCP flow on the second EPS bearer for delivery to the user through the second serving base station,
   wherein each of the first and second MPTCP flows is associated with a single IP address assigned to the user.

9. The gateway network element of claim 8, wherein each of the first and second MPTCP flows are associated with at least one of (i) different source port numbers for an application server providing application services, and (ii) different destination port numbers.

10. The gateway network element of claim 8, wherein the gateway network element is configured to deliver the first MPTCP flow to the first serving base station on the first EPS bearer over an S5/S8 interface between a packet data network (PDN) gateway and a serving gateway, and over a first S1 interface between the serving gateway and the first serving base station.

11. The gateway network element of claim 10, wherein the gateway network element is configured to deliver the second MPTCP flow to the second serving base station on the second EPS bearer over the S5/S8 interface between the packet data network (PDN) gateway and the serving gateway and over a second S1 interface between the serving gateway and the second serving base station.

12. The gateway network element of claim 8, wherein the gateway network element is configured to deliver the first MPTCP flow to the user through the first serving base station.

13. The gateway network element of claim 12, wherein the gateway network element is configured to deliver the second MPTCP flow to the user through the second serving base station.

14. The gateway network element of claim 8, wherein each of the first and second EPS bearers have the same quality of service characteristics.

15. The gateway network element of claim 8, wherein n is 5.

16. The method of claim 1, wherein n is 5.

\* \* \* \* \*